Aug. 5, 1958 J. M. McDONNELL ET AL 2,846,241
PIPE END TO PIPE SIDE JOINT
Filed Aug. 24, 1953 2 Sheets-Sheet 1

INVENTORS
Joseph M. McDonnell
and Galer N. Wright
BY
Craig V. Morton
Their Attorney

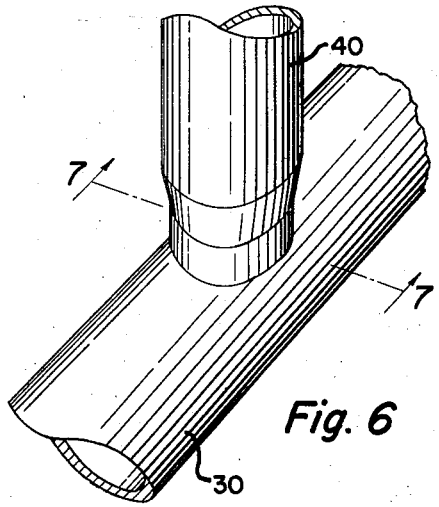
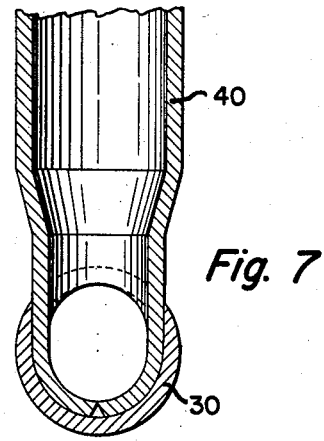
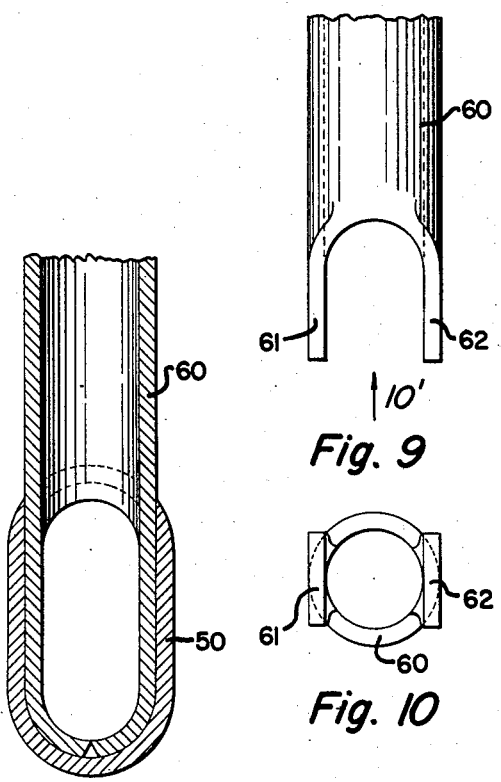
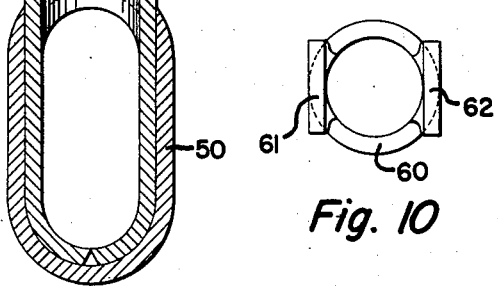
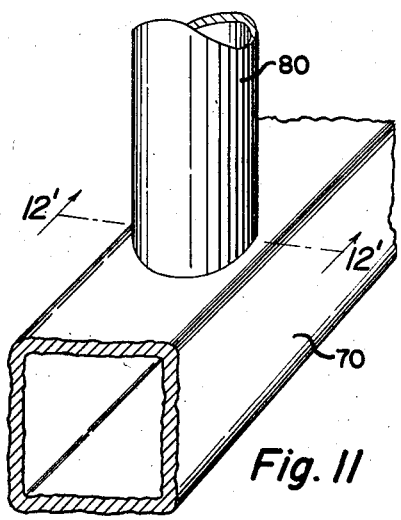
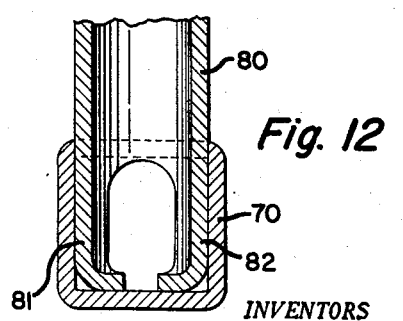

United States Patent Office 2,846,241
Patented Aug. 5, 1958

2,846,241

PIPE END TO PIPE SIDE JOINT

Joseph M. McDonnell and Galer N. Wright, Rochester, N. Y., assignors to General Motors Corporation, Detroit, Mich., a corporation of Delaware Application August 24, 1953, Serial No. 376,032

1 Claim. (Cl. 285—192)

The present invention pertains to a method and means for joining tubes, and more particularly to a method and means for joining tubes in an angular relationship other than coaxial.

Heretofore, difficulty has been encountered in joining the end of one tube to the sidewall of another tube, where the axes of the tubes are not in alignment, inasmuch as such a tube joint does not ordinarily have sufficient strength for high pressure tube assemblies. Consequently, in high pressure tube assembly installations it has been necessary to resort to independent coupling means, such as a T, thereby appreciably increasing the cost of the tube assembly. However, by practicing this invention, a satisfactory rigid and economical tube joint can be produced for most applications. Accordingly, among our objects are the provision of means for joining tubes with their longitudinal axes out of alignment, and the further provision of a method for making a tube joint of the aforesaid character.

The aforementioned and other objects are accomplished in the present invention by uniting surfaces of the outer periphery of the end of one tube to the inner periphery of a portion of another tube, the tubes being other than coaxially arranged. Specifically, the method comprehended by this invention includes the steps of: initially forming an opening in the sidewall of a first tube of a size adapted to snugly receive the end portion of a second tube; then forming a pair of longitudinally extending legs on the end portion of a second tube, then pressing the legs of the second tube into the sidewall opening of the first tube so that the legs of said second tube conform substantially to the inner peripheral surface contour of the first tube, the extremities of the legs being disposed in substantially abutting relation and the exterior surface of the legs being disposed in contiguous relation to the inner peripheral surface of the first tube; and, thereafter, uniting contiguous surfaces of the tubes to form a rigid tube joint.

The side opening in the first tube is formed to have a perimeter which is substantially equal to the exterior perimeter of the end of the second tube. Thus, the first tube is preferably, although not necessarily, of larger cross-sectional area than the second tube. The longitudinally extending tangs, or legs, on the end portion of the second tube are formed by removing diametrically opposed, diverging sections having semi-circular end portions. The arcuate legs, or tangs, consequentially diverge peripherally from their extremities and merge with each other along a diametral line of the second tube. As the wall thickness of the tubes is rather small as compared to the outside diameters, the longitudinally extending arcuate leg portions will conform substantially to the inner peripheral contour of the first tube when the end of the second tube is inserted into the sidewall opening of the first tube and, thereafter, subjected to a force sufficient to cause the extremities of the legs to be substantially positioned in abutting relation. The length of the legs from the roots to the extremities thereof cannot be greater than approximately one-half of the inner perimeter of the tube having the sidewall opening. After the end of the second tube is pressed into position into the sidewall opening of the first tube, the contiguous surfaces of the two tubes may be united by brazing, or soldering. When the tube joint is completed, a substantially elliptical opening is formed in the first tube at the joint between the tubes.

Further objects and advantages of the present invention will be apparent from the following description, reference being had to the accompanying drawing wherein preferred embodiments of the present invention are clearly shown.

In the drawing:

Fig. 6 is a fragmentary view, in perspective, of a completed tube joint between tubes of substantially different sizes.

Fig. 7 is a sectional view taken along line 7—7 of Fig. 6.

Fig. 8 is a sectional view of a tube joint between round and oval tubes.

Fig. 9 is a fragmentary view in elevation depicting the end configuration of the round tube in Fig. 8 prior to assembly.

Fig. 10 is a view in elevation taken in the direction of arrow 10′ of Fig. 9.

Fig. 11 is a fragmentary view, in perspective, of a completed tube joint between round and square tubes.

Fig. 12 is a sectional view taken along line 12′—12′ of Fig. 11.

Figure 2:
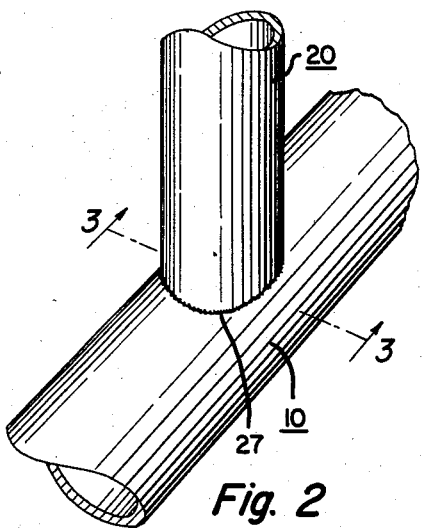
Fig. 2 is a fragmentary view, in perspective, of a completed tube joint made according to this invention.
Figure 3:
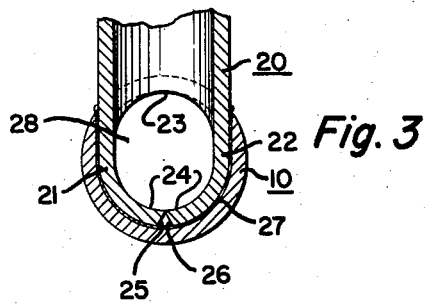
Fig. 3 is a sectional view taken along line 3—3 of Fig. 2.

With particular reference to the drawing, the present invention is depicted as a T-joint between two tubes, that is, a joint wherein the longitudinal axes of the tubes are at right angles to each other. However, it is to be understood that the teachings of the present invention may be employed to join tubes in any angular relation other than coaxial. As shown in Fig. 2, the tube joint includes a first tube 10 and a second tube 20. The tube 10, as shown in Fig. 3, is of larger cross-sectional area than the tube 20. In the embodiment of Figs. 1 through 5, the tubes are selected so that the inner diameter of the tube 10 is substantially equal to the outer diameter of the tube 20, for a reason which will later be apparent. However, the tubes need not be of substantially the same size or shape, as will appear more fully hereinafter. The tubes 10 and 20 are composed of relatively rigid material, such as low carbon steel, and are of such a nature that the wall thickness of the tubes is appreciably less than the inside diameter of the tubes.

Figure 1:
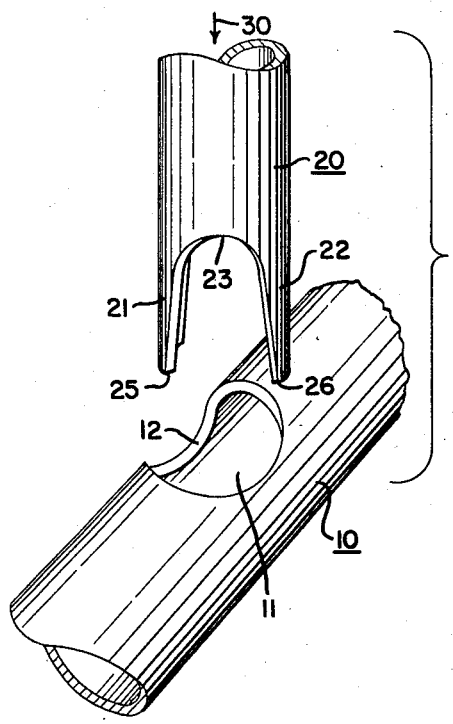
Fig. 1 is a fragmentary view, in perspective, of two round tubes prepared for joining according to the teachings of this invention.

As is shown particularly in Fig. 1, the sidewall of the tube 10 has formed therein an opening 11, the cross-sectional area of which, if projected on a plane surface, is substantially equal to the cross-sectional area of the outside of tube 20. In forming the opening 11 in the tube 10 an edge surface 12 is produced, which, if projected on a plane surface, has a perimeter equal to the exterior circumference, or perimeter, of the tube 20 along their line of contact. Thus, if the end of tube 20 were inserted into the opening 11, the edge surface 12 of the opening 11 would be disposed in contiguous relation to the exterior peripheral surface of the tube 20. Moreover, if the size of opening 11 is accurately controlled with reference to the size of tube 20, the edge surface 12 will be disposed in substantially contiguous relation with the outer periphery of tube 20.

Figures 4, 5:
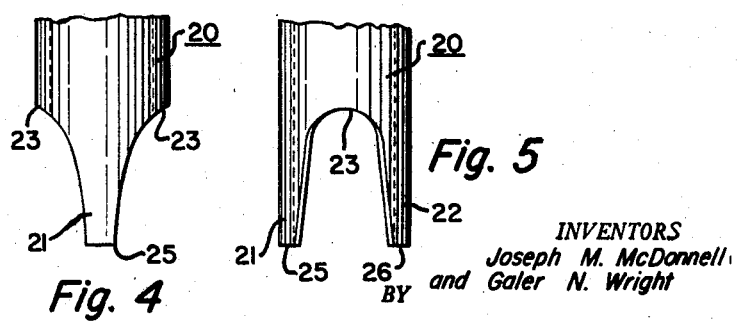
Figs. 4 and 5 are fragmentary views in elevation of the end configuration of one of the tubes.

As is shown in Figs. 1, 4 and 5, the end portion of tube 20 is formed with a pair of diametrically opposed, arcuate, longitudinally extending legs, or tangs, 21 and 22. The length of each of the legs 21 and 22 is preferably less than one-half of the inner perimeter, or circumference, of tube 10. The legs 21 and 22 are formed by removing diametrically opposed diverging sections of the end portion of tube 20, the sections having semi-circular end portions to provide semi-circular edges 23 at the juncture between the root end portions of the legs 21 and 22.

The opening 11 in the tube 10 may be formed by any suitable means, such as drilling, while the leg portions 21 and 22 on the end of tube 20 may be formed by any acceptable tooling means having the desired configuration. As is seen in Figs. 1 and 5, the root portions of the legs merge into the sidewall of tube 20 along the semi-circular section 23. As is seen in Figs. 1 and 4, the sides of legs 21 and 22 converge from their root portions to their extremities, 25 and 26.

After the sidewall opening 11 has been formed in the tube 10, and the projecting leg portions 21 and 22 have been formed on the end of tube 20, the tubes are ready for assembling. Prior to assembly, the tubes are arranged so that the diametrically opposed leg portions 21 and 22 of the tube 20 are oriented with respect to the opening in tube 10 so that upon insertion of the tube end 20 into the sidewall opening 11 of tube 10, the leg portions 21 and 22 will engage the inner peripheral walls of the tube 10. The semi-cylindrical arches 23 are disposed in alignment with the through passage of tube 10. With the tubes 10 and 20 so oriented, when the end of tube 20 is inserted into the sidewall end 11 of the tube 10 and pressed therein in the direction of arrow 30 of Fig. 1, when the extremities 25 and 26 of the leg portions 21 and 22 come into engagement with the interior surface of the tube 10, continued pressure on tube 20 in the direction of arrow 30 will cause the legs 21 and 22 to bend toward each other and conform substantially to the inner peripheral contour of the tube 10. When the extremities 25 and 26 have been positioned in abutting relation, as is shown in Fig. 3, the leg portions 21 and 22 will form a substantially semi-cylindrical surface 24 of a radius substantially equal to the semi-cylindrical surface 23. Thereafter, the contiguous surfaces of the tube 20 and the tube 10 are united by means of brazing, or soldering, the bonding material being designated by the numeral 27 in Fig. 3. The section shown in Fig. 3 through the completed tube joint indicates that the opening 28 through tube 10 at the juncture of the two tubes is substantially elliptical.

With particular reference to Figs. 6 and 7, the present invention is shown as applied to joining tubes of circular cross section, in which the diameters of the tubes differ substantially. Thus, in Figures 6 and 7, tube 30 is formed with a sidewall opening, the tube 30 being of smaller diameter than the tube 40, as is shown in Fig. 7. In order to join tube 40 to tube 30 in accordance with the present invention, it is first necessary to reduce the diameter of an end portion of the tube 40 by any suitable means, such as swaging. Thereafter, the method of preparing the projecting legs, or tangs, on the end of tube 40 and the remaining steps in the tube joint assembly are identical to the steps outlined in accordance with the tube joint of Figs. 1 through 5. Thus, it is apparent that the teachings of the present invention are applicable to joining tubes of any desired size.

With particular reference to Figs. 8 through 10, the principles of the present invention are shown as being applied to the joining of a tube of circular cross section to a tube of oval, or elliptical, cross section. In this instance, tube 50 having a sidewall opening is of elliptical cross section, while tube 60 having the projecting leg portions, or a forked end, is of circular cross section. However, inasmuch as the sidewalls of the elliptical tube 50 are parallel, it becomes necessary to flatten the extending legs 61 and 62 of the tube 60 prior to assembly, to facilitate engagement between the outer surfaces of legs 61 and 62 and the inner peripheral surface of the tube 50.

With reference to Figs. 11 and 12, a joint between tubes of circular cross section and square cross section is shown. In this instance, the square tube 70 is provided with the sidewall opening adapted to receive the end of the round tube 80. When the tube 80 having the forked end is inserted into the sidewall opening of the tube 70, the ends of legs 81 and 82 will be bent towards each other, but, as is shown in Fig. 12, the ends of legs 81 and 82 are not positioned in abutting relation, as is accomplished in the other embodiments. However, by deforming the end portions of legs 81 and 82 during the assemblage of tubes 70 and 80, the rigidity of the tube joint is increased. The arcuate or radially inwardly opening cross section of the legs 81 and 82 makes them more susceptible to inward than outward bending or buckling.

From the foregoing, it is manifest that the present invention provides a tube joint which is extremely rigid. Moreover, the tube joint may be economically manufactured and is readily adaptable for use with tube assemblies designed for high pressure installations.

While the embodiments of the present invention as herein disclosed, constitute preferred forms, it is to be understood that other forms might be adopted.

What is claimed is as follows:

As an article of manufacture, a first tube, a second tube, said first tube having an opening in the side wall thereof and a curved interior side wall portion opposite said opening, the projected cross-sectional areas of said opening and said second tube being substantially equal, the exterior diameter of said second tube being substantially equal to the interior diameter of said first tube, the end portion of said second tube having a pair of longitudinally extending opposed legs, said legs having sides converging from the root portions of said legs to their extremities, said legs having a length from their roots to their extremities which is less than one-half of the interior perimeter of said first tube, the exterior side wall surface of said second tube being disposed in contiguous relation to the edge of the opening in the first tube, the legs of said second tube being disposed within and contiguous with the peripheral side wall surface of said first tube between said opening and said curved interior side wall portion, the extremities of said legs being disposed in abutting relation in said curved interior side wall portion of said first tube, said legs forming an opening longitudinally of the first tube and substantially equal in area to the internal cross-section of the second tube, and means uniting contiguous surfaces of said tubes to form a joint therebetween.

References Cited in the file of this patent

UNITED STATES PATENTS

| 414,194 | Cottle | Nov. 5, 1889 |
| 500,971 | Starley | July 4, 1893 |
| 854,561 | Brookes | May 21, 1907 |
| 861,409 | Wagner | July 30, 1907 |
| 869,340 | Walworth | Oct. 29, 1907 |
| 972,119 | McKibben | Oct. 4, 1910 |
| 1,370,224 | Redding | Mar. 1, 1921 |
| 1,427,904 | Junkers | Sept. 5, 1922 |
| 1,850,049 | Cornell | Mar. 15, 1932 |
| 1,850,843 | Lagerblade | Mar. 22, 1932 |
| 2,088,961 | Jordan | Aug. 3, 1937 |
| 2,297,013 | Nichols et al. | Sept. 29, 1942 |
| 2,614,827 | Peach et al. | Oct. 21, 1952 |

FOREIGN PATENTS

| 23,189 | France | May 14, 1921 |
| | (Addition to 523,810) | |
| 896,089 | France | Apr. 17, 1944 |